(12) United States Patent
Pebbles

(10) Patent No.: US 8,781,657 B2
(45) Date of Patent: Jul. 15, 2014

(54) ROADSIDE HANDLING FOR ALTERNATE-PROPULSION SYSTEMS

(75) Inventor: Paul H. Pebbles, Novi, MI (US)

(73) Assignee: General Motors, LLC, Detroit, MI (US)

( * ) Notice: Subject to any disclaimer, the term of this patent is extended or adjusted under 35 U.S.C. 154(b) by 785 days.

(21) Appl. No.: 12/785,011

(22) Filed: May 21, 2010

(65) Prior Publication Data

US 2011/0288700 A1 Nov. 24, 2011

(51) Int. Cl.
B60L 9/00 (2006.01)

(52) U.S. Cl.
USPC ............................. 701/22; 702/183; 180/277

(58) Field of Classification Search
USPC ...................... 701/22, 33; 702/183; 180/277
See application file for complete search history.

(56) References Cited

U.S. PATENT DOCUMENTS

| 5,369,540 | A | * | 11/1994 | Konrad et al. ..................... 361/6 |
| 6,028,537 | A | * | 2/2000 | Suman et al. ................. 340/988 |
| 6,860,357 | B2 | * | 3/2005 | Hayakawa ..................... 180/277 |
| 8,253,359 | B2 | * | 8/2012 | Tanaka et al. ................. 318/376 |
| 2005/0134504 | A1 | * | 6/2005 | Harwood et al. ........ 342/357.14 |
| 2006/0007622 | A1 | * | 1/2006 | Furukawa et al. ............. 361/115 |
| 2006/0293813 | A1 | * | 12/2006 | Nou ................................ 701/33 |
| 2010/0241560 | A1 | * | 9/2010 | Landau-Holdsworth et al. ................................ 705/39 |
| 2011/0213983 | A1 | * | 9/2011 | Staugaitis et al. ............. 713/176 |
| 2011/0218698 | A1 | * | 9/2011 | Bissontz ......................... 701/22 |

* cited by examiner

Primary Examiner — Helal A Algahaim
Assistant Examiner — Shardul Patel
(74) Attorney, Agent, or Firm — Leydig, Voit & Mayer, Ltd.

(57) ABSTRACT

The described method and system allow a service provider to remotely interact with a vehicle analysis system, high voltage battery contactors, and other vehicle systems to eliminate certain sources of inconvenience for service personnel and users. For example, when the high voltage battery contactors are disconnected inadvertently or as a precaution, they may later need to be safely reengaged to allow the user to drive the disabled but otherwise operational vehicle. Conversely, when an electric vehicle has become disabled and needs to be towed or serviced, the disengagement of the high voltage battery contactors as well as the activation or deactivation of related systems will assist the servicing entity in properly moving and servicing the vehicle.

16 Claims, 4 Drawing Sheets

ROADSIDE HANDLING FOR ALTERNATE-PROPULSION SYSTEMS

BACKGROUND OF THE INVENTION

Electric-only and hybrid electric vehicles have become increasingly capable and increasingly popular in recent years, as rising fossil fuel prices and improved battery technologies level the cost and performance fields between the vehicle types. Indeed, while the range and acceleration of production-level electric vehicles have historically lagged behind those of their fuel-powered counterparts, this situation is rapidly changing as high-capacity battery technologies are optimized and commercialized.

Nonetheless, despite the increasing parity between electric vehicles and fuel-powered vehicles, there are numerous differences between the vehicle types that require different handling and operational procedures. For example, the voltage present in a fuel-powered vehicle is generally fairly low, e.g., 12 volts, with the exception of certain sheltered areas such as spark plugs and ignition-related capacitors and transformers. In contrast, the core power system in an electric vehicle often exposes very high voltages, e.g., hundreds of volts, and does so at significant current levels.

Moreover, the charging and discharging of high-capacity electrical cells require more care than the analogous activity of filling a gas tank and using the gas. For example, many battery technologies require that the discharge cycle be controlled such that the battery cells are not discharged to a state of less than a certain voltage value per cell. Discharge rates are also often limited. Thus, it is important to control the rate at which battery cells are discharged and to monitor and cease the discharge before it reaches a level that may damage one or more cells of the battery.

One way to prevent a battery or battery bank from overly discharging or from exposing a dangerous voltage level at an inappropriate time is to use one or more contactors to isolate the battery from the remaining components and circuitry of the vehicle. This is also useful as an interlock feature, so that if a motor controller were to malfunction and present a short-circuit, the contactors can disconnect power and prevent an undesired acceleration.

However, while the use of contactors is generally beneficial, the inventors have discovered that there are situations wherein the contactors can also cause inconvenience for the operator or service personnel. It is an object in certain implementations of the invention to provide a system that may prevent or overcome certain of these problems. Nonetheless, it will be appreciated that the invention is not limited to systems that solve the problems noted herein. Moreover, the inventors have created the above body of information for the convenience of the reader and expressly disclaim all of the foregoing as prior art; the foregoing is a discussion of problems discovered and/or appreciated by the inventors, and is not an attempt to review or catalog the prior art.

BRIEF SUMMARY OF THE INVENTION

The invention provides a system and apparatus for remotely interacting with the vehicle analysis system and high voltage battery contactors to eliminate certain sources of inconvenience. For example, when the high voltage battery contactors are disconnected inadvertently or as a precaution, they may later need to be safely reengaged to allow the user to drive the presently disabled but otherwise operational vehicle. Conversely, when an electric vehicle has become entirely disabled and needs to be towed or serviced, the disengagement of the high voltage battery contactors as well as the activation or deactivation of related systems may assist the servicing entity in properly moving and servicing the vehicle.

To these ends, certain aspects and implementations of the inventive concepts allow a user or other authorized entity to remotely re-engage the disconnected high voltage battery contactors, once a prerequisite validation analysis of the vehicle status has been remotely completed. Similarly, when the vehicle is disabled and the high voltage battery contactors or related systems have not activated/deactivated as desired, an authorized remote entity may remotely prepare the vehicle for towing or service by remotely verifying vehicle status and selectively activating disabling measures.

Other objects and advantages of the invention will become apparent upon reading the following detailed description and upon reference to the drawings.

DETAILED DESCRIPTION OF THE INVENTION

Before discussing the details of the invention and the environment wherein the invention may be used, a brief overview is given to guide the reader. In general terms, not intended to limit the claims, the invention is directed to a system and method for remotely assisting a user or service personnel regarding an electric vehicle. Specifically, the system allows a telematics service provider to remotely trigger the vehicle to be prepared for towing and to receive a message back from the vehicle to verify the vehicle status. Specific activities that may be undertaken to prepare the vehicle for towing are: high-voltage battery disconnect, charge disabling if the vehicle is plugged in, and turning off of regenerative braking systems to allow the vehicle to be more easily towed.

In the event that the high voltage battery contactors have been disengaged, the system allows a telematics system to remotely command the contactors to re-engage after performing a remote validation that it is safe to re-engage the contactors. This may improve the customer experience by eliminating the need to have the vehicle towed. However, the described principles also assist in the event that towing and/or service are needed. In particular, if such a vehicle is disabled and requires roadside assistance, a service provider can transmit a signal to the vehicle to instruct the vehicle to prepare itself for towing. In one aspect, this may occur only after receiving a message back from the vehicle to verify the vehicle status. Having a vehicle prepared for towing or service will tend to increases the confidence of the roadside provider that the vehicle will be ready to tow and may also prevent any additional damage to the vehicle during towing.

Figure 1:
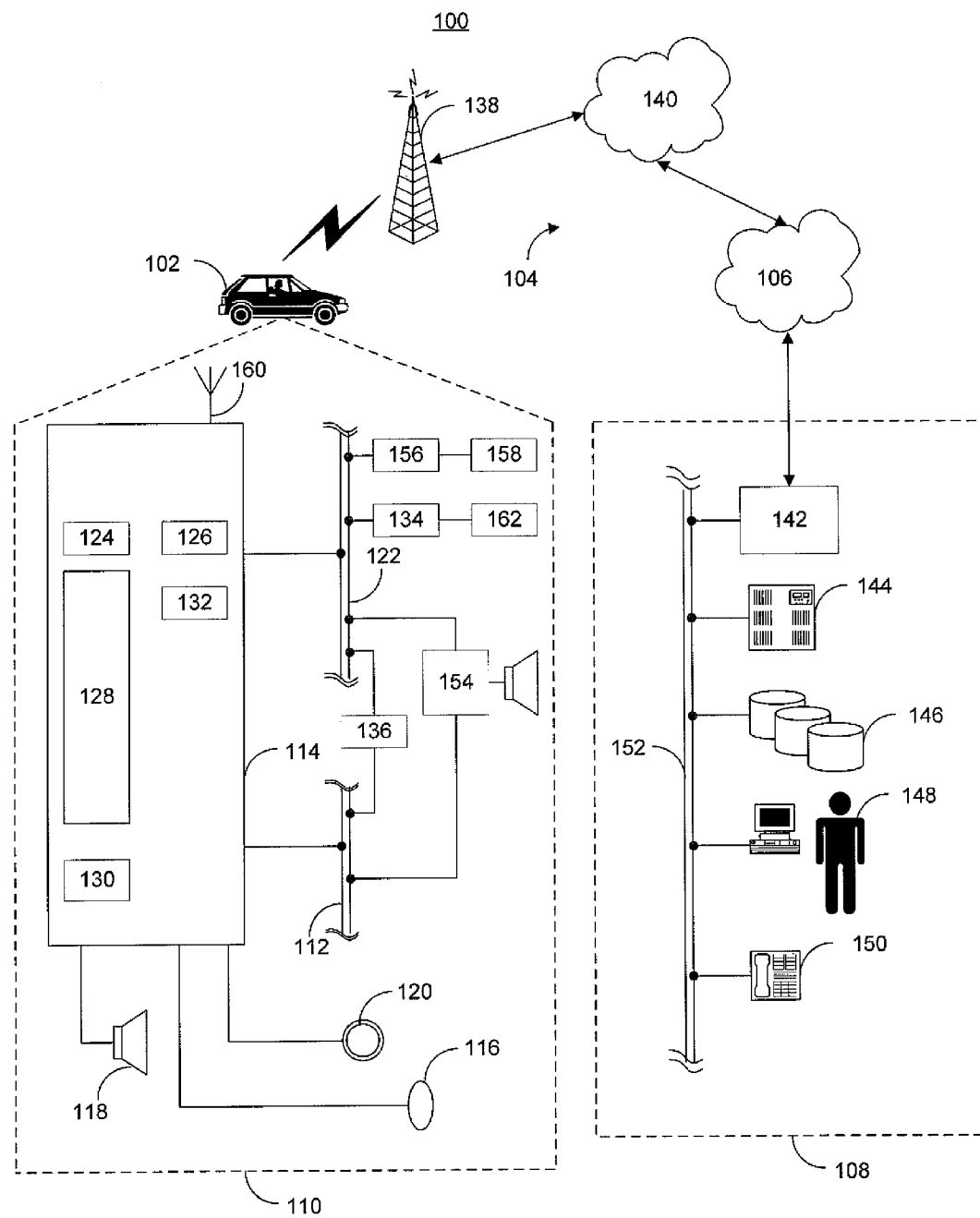
FIG. 1 is a schematic diagram of an operating environment for a mobile vehicle communication system usable in implementations of the described principles.

Given this overview, an exemplary environment in which the invention may operate is described hereinafter. It will be appreciated that the described environment is an example, and does not imply any limitation regarding the use of other environments to practice the invention. With reference to FIG. 1 there is shown an example of a communication system 100 that may be used with the present method and generally includes a vehicle 102, a wireless carrier system 104, a land network 106 and a call center 108. It should be appreciated that the overall architecture, setup and operation, as well as the individual components of a system such as that shown here are generally known in the art. Thus, the following paragraphs simply provide a brief overview of one such exemplary information system 100; however, other systems not shown here could employ the present method as well.

Vehicle 102 is preferably a mobile vehicle such as a motorcycle, car, truck, recreational vehicle (RV), boat, plane, etc., and is equipped with suitable hardware and software that enables it to communicate over system 100. Some of the vehicle hardware 110 is shown generally in FIG. 1 including a telematics unit 114, a microphone 116, a speaker 118 and buttons and/or controls 120 connected to the telematics unit 114. Operatively coupled to the telematics unit 114 is a network connection or vehicle bus 122. Examples of suitable network connections include a controller area network (CAN), a media oriented system transfer (MOST), a local interconnection network (LIN), an Ethernet, and other appropriate connections such as those that conform with known ISO, SAE, and IEEE standards and specifications, to name a few.

The telematics unit 114 is an onboard device that provides a variety of services through its communication with the call center 108, and generally includes an electronic processing device 128 one or more types of electronic memory 130, a cellular chipset/component 124, a wireless modem 126, a dual antenna 160 and a navigation unit containing a GPS chipset/component 132. In one example, the wireless modem 126 is comprised of a computer program and/or set of software routines executing within processing device 128. The cellular chipset/component 124 and the wireless modem 126 may be called the network access device (NAD) of the telematics unit 114.

The telematics unit 114 provides too many services to list them all, but several examples include: turn-by-turn directions and other navigation-related services provided in conjunction with the GPS based chipset/component 132; airbag deployment notification and other emergency or roadside assistance-related services provided in connection with various crash and or collision sensor interface modules 156 and sensors 158 located throughout the vehicle. Infotainment-related services where music, Web pages, movies, television programs, video games and/or other content is downloaded by an infotainment center 136 operatively connected to the telematics unit 114 via vehicle bus 122 and audio bus 112. In one example, downloaded content is stored for current or later playback.

Again, the above-listed services are by no means an exhaustive list of all the capabilities of telematics unit 114, as should be appreciated by those skilled in the art, but are simply an illustration of some of the services that the telematics unit 114 is capable of offering. It is anticipated that telematics unit 114 include a number of known components in addition to those listed above.

Vehicle communications preferably use radio transmissions to establish a voice channel with wireless carrier system 104 so that both voice and data transmissions can be sent and received over the voice channel. Vehicle communications are enabled via the cellular chipset/component 124 for voice communications and a wireless modem 126 for data transmission. In order to enable successful data transmission over the voice channel, wireless modem 126 applies some type of encoding or modulation to convert the digital data so that it can communicate through a vocoder or speech codec incorporated in the cellular chipset/component 124. Any suitable encoding or modulation technique that provides an acceptable data rate and bit error can be used with the present method. Dual mode antenna 160 services the GPS chipset/component and the cellular chipset/component.

Microphone 116 provides the driver or other vehicle occupant with a means for inputting verbal or other auditory commands, and can be equipped with an embedded voice processing unit utilizing a human/machine interface (HMI) technology known in the art. Conversely, speaker 118 provides verbal output to the vehicle occupants and can be either a stand-alone speaker specifically dedicated for use with the telematics unit 114 or can be part of a vehicle audio component 154. In either event, microphone 116 and speaker 118 enable vehicle hardware 110 and call center 108 to communicate with the occupants through audible speech. The vehicle hardware also includes one or more buttons or controls 120 for enabling a vehicle occupant to activate or engage one or more of the vehicle hardware components 110. For example, one of the buttons 120 can be an electronic push button used to initiate voice communication with call center 108 (whether it be a live advisor 148 or an automated call response system). In another example, one of the buttons 120 can be used to initiate emergency services.

The audio component 154 is operatively connected to the vehicle bus 122 and the audio bus 112. The audio component 154 receives analog information, rendering it as sound, via the audio bus 112. Digital information is received via the vehicle bus 122. The audio component 154 provides AM and FM radio, CD, DVD, and multimedia functionality independent of the infotainment center 136. Audio component 154 may contain a speaker system, or may utilize speaker 118 via arbitration on vehicle bus 122 and/or audio bus 112.

The vehicle crash and/or collision detection sensor interface 156 are operatively connected to the vehicle bus 122. The crash sensors 158 provide information to the telematics unit 114 via the crash and/or collision detection sensor interface 156 regarding the severity of a vehicle collision, such as the angle of impact and the amount of force sustained.

Vehicle sensors 162, connected to various sensor interface modules 134 are operatively connected to the vehicle bus 122. Example vehicle sensors include but are not limited to gyroscopes, accelerometers, magnetometers, emission detection and/or control sensors, and the like. Example sensor interface modules 134 include power train control, climate control, and body control, to name but a few.

Wireless carrier system 104 is preferably a cellular telephone system or any other suitable wireless system that transmits signals between the vehicle hardware 110 and land network 106. According to an example, wireless carrier system 104 includes one or more cell towers 138, base stations and/or mobile switching centers (MSCs) 140, as well as any other networking components required to connect the wireless system 104 with land network 106. A component in the mobile switching center may include a remote data server 144.

As appreciated by those skilled in the art, various cell tower/base station/MSC arrangements are possible and could be used with wireless system 104. For example, a base station and a cell tower could be co-located at the same site or they could be remotely located, and a single base station could be coupled to various cell towers or various base stations could be coupled with a single MSC, to but a few of the possible arrangements. Preferably, a speech codec or vocoder is incorporated in one or more of the base stations, but depending on the particular architecture of the wireless network, it could be incorporated within a Mobile Switching Center or some other network components as well.

Land network 106 can be a conventional land-based telecommunications network that is connected to one or more landline telephones and connects wireless carrier network 104 to call center 108. For example, land network 106 can include a public switched telephone network (PSTN) and/or an Internet protocol (IP) network, as is appreciated by those skilled in the art. Of course, one or more segments of the land network 106 can be implemented in the form of a standard wired network, a fiber or other optical network, a cable network, other wireless networks such as wireless local networks (WLANs) or networks providing broadband wireless access (BWA), or any combination thereof.

Call Center (OCC) 108 is designed to provide the vehicle hardware 110 with a number of different system back-end functions and, according to the example shown here, generally includes one or more switches 142, servers 144, databases 146, live advisors 148, as well as a variety of other telecommunication and computer equipment 150 that is known to those skilled in the art. These various call center components are preferably coupled to one another via a network connection or bus 152, such as the one previously described in connection with the vehicle hardware 110. Switch 142, which can be a private branch exchange (PBX) switch, routes incoming signals so that voice transmissions are usually sent to either the live advisor 148 or an automated response system, and data transmissions are passed on to a modem or other piece of equipment 150 for demodulation and further signal processing.

The modem 150 preferably includes an encoder, as previously explained, and can be connected to various devices such as a server 144 and database 146. For example, database 146 could be designed to store subscriber profile records, subscriber behavioral patterns, or any other pertinent subscriber information. Although the illustrated example has been described as it would be used in conjunction with a manned call center 108, it will be appreciated that the call center 108 can be any central or remote facility, manned or unmanned, mobile or fixed, to or from which it is desirable to exchange voice and data.

Figure 2:
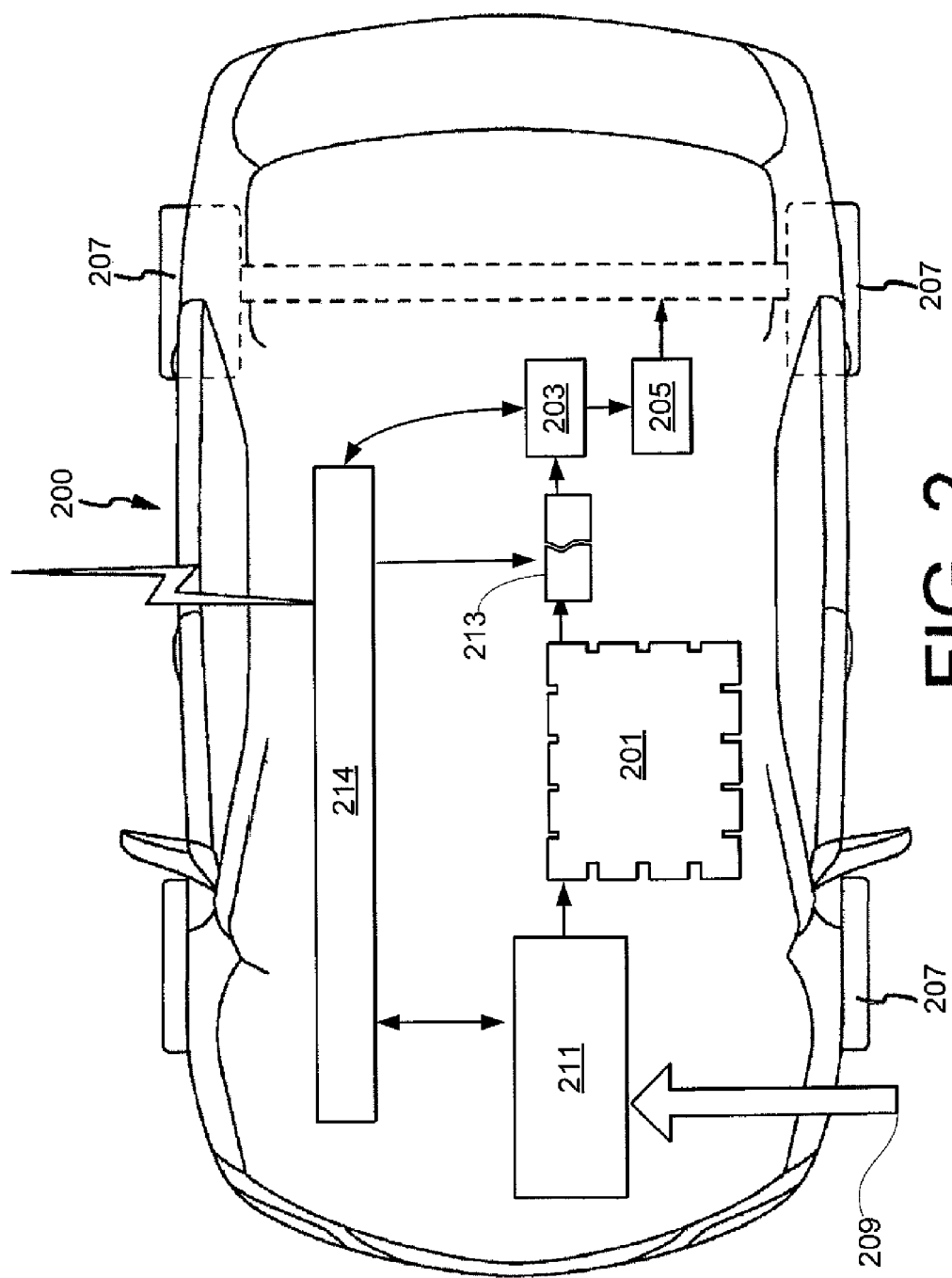
FIG. 2 is a schematic vehicle diagram showing relevant power links and communications linkages within the vehicle and between the vehicle and a remote entity.

As noted above, the telematics unit 114 and associated components are associated in an implementation of the invention with a vehicle 102. In particular, the vehicle 102 is a hybrid-electric or electric vehicle. FIG. 2 is a vehicle schematic showing the components of the vehicle of interest with the respect to the disclosed principles and the manner in which the components may be interrelated to execute those principles. It will be appreciated, however, that the illustrated architecture is merely an example, and that the disclosed principles do not require that the vehicle be configured precisely as shown.

In the illustrated example, the vehicle 200 (102) includes an electrical energy storage system 201 which is a battery or battery bank ("battery") of suitable voltage and capacity. Suitable battery types include but are not limited to lead acid batteries, Nickel Cadmium batteries (NiCd), Nickel Metal Hydride batteries (NiMH), Lithium Ion batteries and Lithium Polymer batteries.

The battery 201 is conductively linkable, e.g., via a controller 203, to an electrical drive unit 205, e.g., an electrical motor or motors. The electrical energy may be modulated, voltage-modified, or otherwise modified by the controller 203 as needed to drive the electrical drive unit 205. The electrical drive unit 205 is linked or linkable to a ground engaging drive, typically including one or more wheels 207.

In one optional implementation, a plug interface 209 is provided in order to charge the battery 201, although it will be appreciated that the teachings herein apply beyond vehicles having plug-in architectures as well. The plug interface 209 is linked to the battery 201 via a charge controller 211. The telematics unit 214 (114) is adapted to receive information from a remote source as discussed above to convey data regarding vehicle systems and to facilitate alerts when appropriate.

An aspect of the vehicle 200 and battery 201 is the ability to electrically disconnect the high voltage of the battery 201 from the rest of the car by controlling at least one and preferably two or more high voltage contactors 213 if an adverse condition is detected. For example, the controller 203 may monitor battery parameters such as voltage (or voltages within multiple cells), currents, pack temperature etc., to determine if any of these parameters indicates a problem requiring the battery 201 to be disconnected. The controller 203 may also monitor, or be linked to an entity that does monitor, important vehicle parameters that may impact battery operation and safety such as acceleration or deceleration (e.g. to detect a collision), vehicle attitude and orientation (e.g. to detect rollover), interior climate conditions including smoke, humidity, moisture and so on.

In the event that the battery parameter or vehicle parameter sensors detect a condition requiring disconnect, the controller 203 activates the high voltage battery contactors 213 to quickly, e.g., within milliseconds, disconnect the high voltage of the battery pack 201 from the car. With some designs, the high voltage contactors 213 must be electrically activated in order to open (default closed), while in other cases the high voltage contactors 213 must be electrically activated in order to close (default open).

As will be appreciated by those of skill in the art, the contactors 213 are similar to electrical power relays, although any suitable contactor design and make may be used. Moreover, it will be appreciated that the set of contactors within a vehicle may comprise one or more contactors that are themselves sufficient to open and close the power circuit, or may comprise contactors placed in serial or parallel configuration to provide logical "AND" operation and/or logical "OR" operation.

Figure 3:
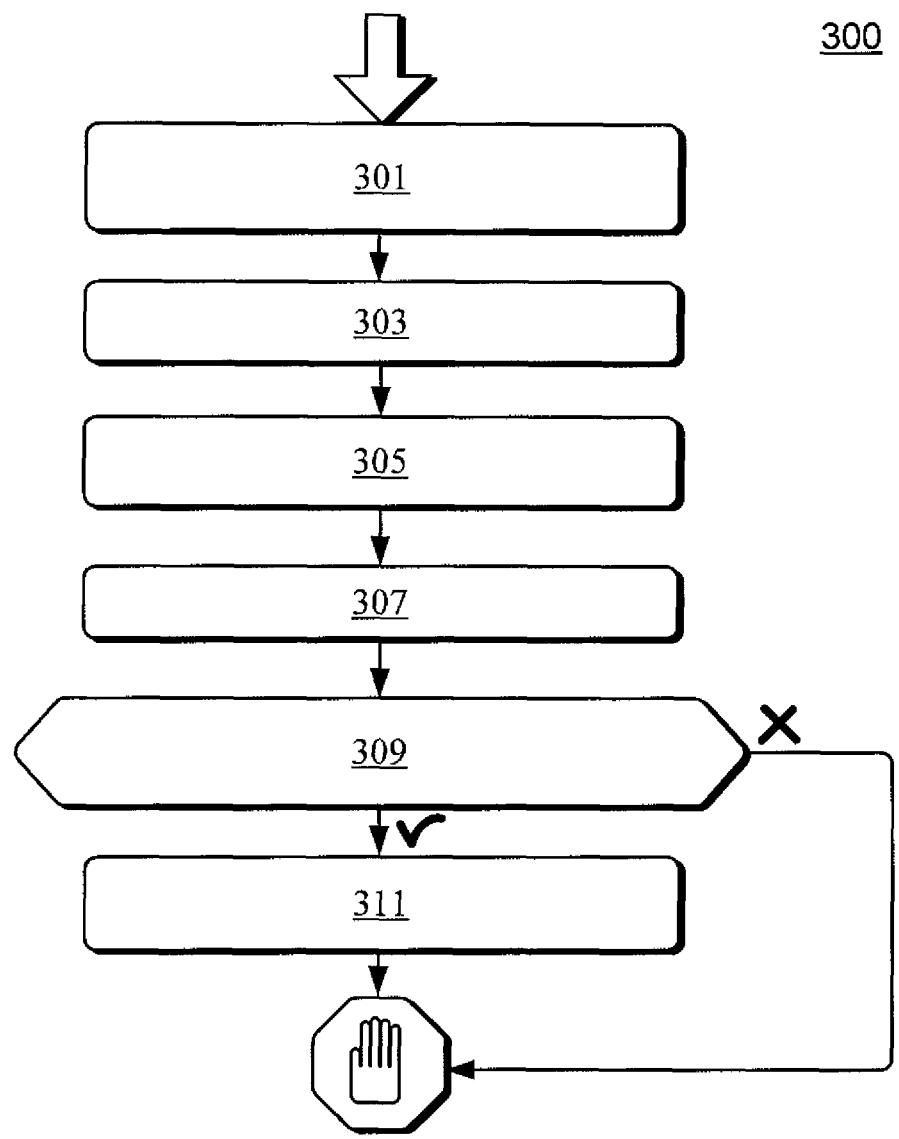
FIG. 3 is a flowchart illustrating a process of reengaging opened high voltage contactors to provide roadside assistance to a user of a vehicle.

With further reference to the architecture of FIGS. 1 and 2, and turning to FIG. 3, a process 300 is shown for reengaging opened contactors to provide roadside assistance to a user. The process 300 begins at stage 301, wherein the telematics unit 114, controller 203, or other module detects a condition that requires the contactors to be disengaged for purposes of personnel safety or vehicle safety. At stage 303, in response to detecting the anomalous condition, the detecting entity disengages, or causes to be disengaged, the high voltage contactors 213. Depending upon the design of the high voltage contactors 213, they may disengaged by different mechanisms. For example, high voltage contactors that are defaulted on may be energized to disengage, while high voltage contactors that are defaulted off may be de-energized to open.

At stage 305, the telematics unit 114 or controller 203 receives or generates a request to reconnect the high voltage contactors 213. This request may originate from a user request, e.g., via a button push on the telematics unit 114 interface or via a service provider operator request pursuant to a user report, or may be internally generated as a routine matter to check for unwarranted disconnections.

Having received the request for reconnection, the telematics unit 114 or controller 203 initiates a safety check protocol. In particular at stage 307, the telematics unit 114 or controller 203 verifies that none of the conditions that would warrant a disconnect has occurred. The safety check protocol may be remotely triggered and managed, e.g., by an operator at the service center or an automated remote process, in either case connecting to the vehicle via the telematics unit 114. Alternatively, the safety check protocol may be locally triggered and locally managed by the telematics unit 114 or controller 203.

At stage 309, it is determined whether the safety check has successfully completed or not. It is contemplated that successful completion may entail the detection of no errors or the detection of no errors except errors unrelated to personnel safety. If the safety check has successfully completed at stage 309, the process 300 moves to stage 311, wherein the telematics unit 114 or the controller 203 reengages the high voltage contactors 213 and the process 300 terminates. Otherwise, if the safety check was not successfully completed at stage 309, the process 300 terminates. In one optional mode, the process 300 may re-execute the safety protocol one or more times before terminating.

It will be appreciated from the foregoing that if the vehicle cannot be returned to operational status, then third party assistance may be needed, e.g., to tow or repair the vehicle. However, the emergency shutdown of the vehicle may have created conditions making it difficult to render such assistance, and the system described herein will allow the service provider to prepare the vehicle to allow a third party to more easily render assistance.

In one aspect, the service provider is able to send a signal to the vehicle to contact the vehicle so as to prepare the vehicle for towing after receiving a message back from the vehicle to verify the vehicle status. The vehicle may be prepared in different ways, but exemplary steps include high-voltage battery disconnect via the high voltage contactors 213, charge disabling if the vehicle is plugged in, and deactivating regenerative braking facilities to allow the vehicle to be towed more easily.

Figure 4:
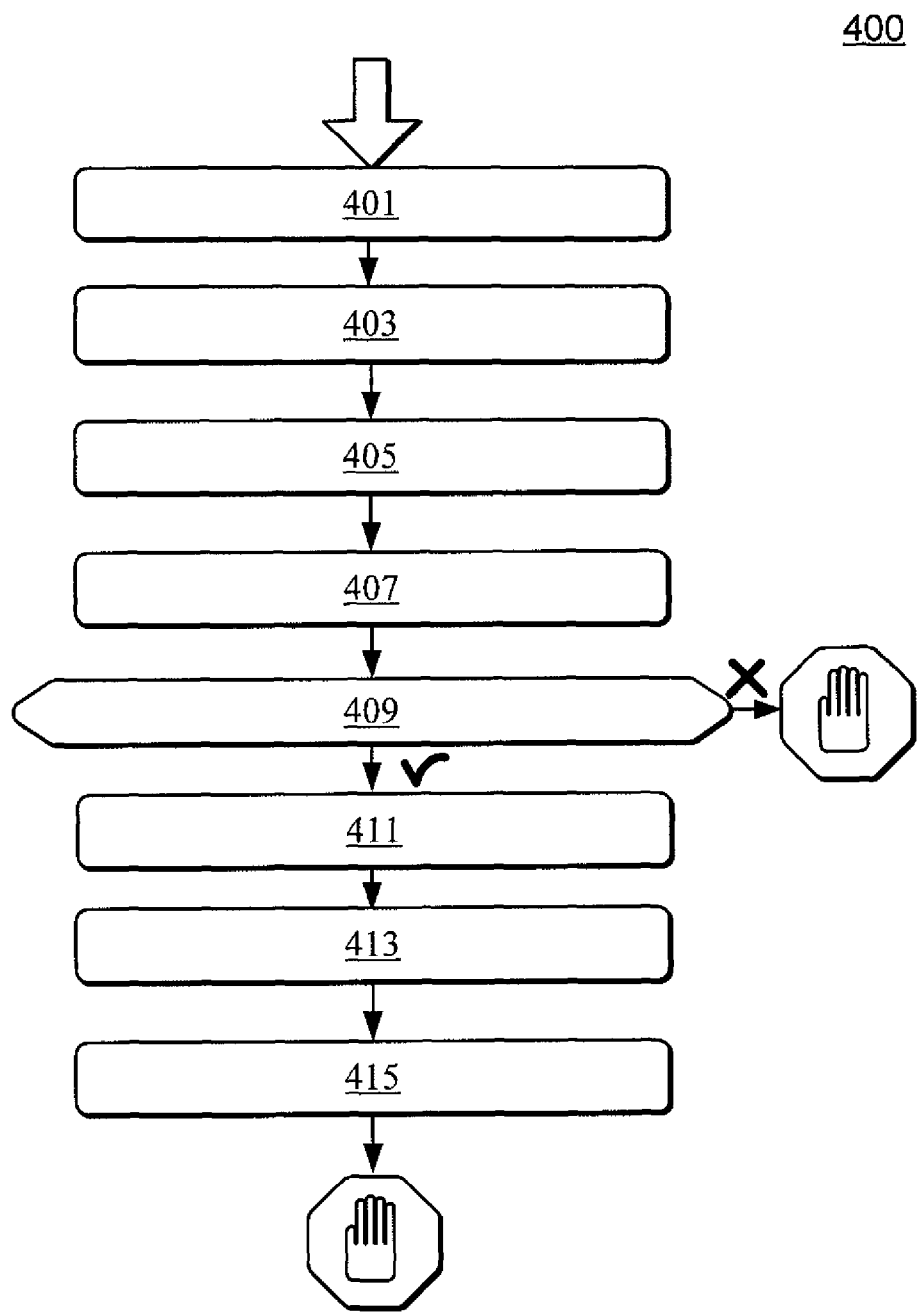
FIG. 4 is a flowchart illustrating a process of remotely preparing a vehicle to receive roadside assistance from third party personnel.

With this situation in mind, FIG. 4 is a flowchart illustrating a process of remotely preparing the vehicle to receive roadside assistance from third party personnel. In particular, at stage 401 of the process 400, the remote service provider receives a request to prepare the vehicle for towing or service. The request received in stage 401 may originate from the vehicle via the wireless network linked to the telematics unit 114, or may be received from personnel at the service provider, e.g., pursuant to a call received from the vehicle user or otherwise.

Once the remote service provider has received a request to prepare the vehicle for towing or service, the remote service provider sends a diagnostic request to the vehicle, e.g., via the vehicle telematics unit 114 at stage 403. In response to receiving the diagnostic request, the telematics unit causes the vehicle to run a diagnostic protocol at stage 405 to determine whether the vehicle may be safely towed or repaired.

For example, if the vehicle is disabled but there is no condition which would cause a risk to personnel or to the vehicle, the diagnostic check may return an affirmative response. An example of a condition which disables the vehicle but does not present a risk of injury or damage is the depletion of the onboard battery in an electric-only vehicle, or the depletion of both the battery and the onboard fuel in a hybrid vehicle. An example of a condition that both disables the vehicle and presents a risk of damage if the vehicle is towed would include a condition wherein gearing linked to one or more wheels has seized, rendering the vehicle untowable if further damage is to be avoided.

At stage 407 of the process 400, the vehicle returns the result of the diagnostic check to the remote service provider, i.e., indicating whether the diagnostic check has generated an affirmative response (that the vehicle is disabled but towable or serviceable) or a negative response. In the event that the response is negative as determined at stage 409, the process 400 terminates from stage 409. Otherwise, the process 400 continues to stage 411, whereupon the service provider transmits a preparation signal to the vehicle. The preparation signal includes instructions to the telematics unit 114 or other controller to prepare the vehicle for towing and/or service.

At stage 413, having received the preparation signal, the telematics unit 114 executes a preparation protocol to enable towing or service, including for example, deenergizing the vehicle electrical power system by disconnecting the high-voltage battery contactors 213, disabling charging if the vehicle is plugged in, and/or deactivating regenerative braking facilities to allow the vehicle to be towed more easily.

After executing the preparation protocol, the telematics unit 114 transmits a confirmation signal to the service provider at stage 415 to verify that the necessary preparation steps have been taken, and the process 400 then terminates.

It will be appreciated that the described system allows a vehicle battery to be both reactivated and deactivated remotely to either alleviate a false de-energization or to provide preparation for towing and servicing. It will also be appreciated, however, that the foregoing methods and implementations are merely examples of the inventive principles, and that these illustrate only preferred techniques.

It is thus contemplated that other implementations of the invention may differ in detail from foregoing examples. As such, all references to the invention are intended to reference the particular example of the invention being discussed at that point in the description and are not intended to imply any limitation as to the scope of the invention more generally. All language of distinction and disparagement with respect to certain features is intended to indicate a lack of preference for those features, but not to exclude such from the scope of the invention entirely unless otherwise indicated.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method for preparing an electric vehicle for use, the vehicle having one or more high voltage contactors to convey electrical power from a battery of the electric vehicle to one or more systems of the vehicle, the method comprising: detecting a condition that requires disengagement of the one or more high voltage contactors; disengaging the one or more high voltage contactors; transmitting, to a remotely located server, a user request to reengage the high voltage contactors from a user of the electric vehicle; initiating a safety check protocol to verify an absence of any condition that would warrant disengagement, wherein initiating the safety check protocol comprises remotely triggering the safety check protocol via a telematics unit within the vehicle; and reengaging the high voltage contactors if the safety check protocol verifies an absence of any condition that would warrant disengagement.

2. The method according to claim 1, wherein detecting a condition that requires disengagement of the one or more high voltage contactors comprises detecting such a condition at a telematics unit within and associated with the electric vehicle.

3. The method according to claim 1, wherein detecting a condition that requires disengagement of the one or more high voltage contactors comprises detecting a condition that presents a risk to one of personnel safety and vehicle safety.

4. The method according to claim 1, wherein disengaging the one or more high voltage contactors comprise electrically energizing or de-energizing the contactors to disengage them.

5. The method according to claim 1, wherein disengaging the one or more high voltage contactors comprise electrically de-energizing or de-energizing the contactors to disengage them.

6. The method according to claim 1, wherein the request to reengage the high voltage contactors comprises a service provider operator request pursuant to a user report.

7. The method according to claim 1, wherein initiating a safety check protocol to verify the absence of any condition that would warrant disengagement comprises triggering the safety check protocol by a telematics unit within the vehicle.

8. The method according to claim 1, wherein reengaging the high voltage contactors if the safety check protocol is successfully completed comprises reengaging the high voltage contactors if no vehicle malfunctions are detected.

9. The method according to claim 1, wherein reengaging the high voltage contactors if the safety check protocol is successfully completed comprises reengaging the high voltage contactors if no vehicle malfunctions relating to personnel safety are detected.

10. The method according to claim 1, further comprising re-executing the safety check protocol one or more times if the safety checks protocol detects a condition that would warrant disengagement.

11. A non-transitory computer-readable medium having computer-executable instructions stored thereon for preparing an electric vehicle for use, the vehicle having one or more high voltage contactors to convey electrical power from a battery of the electric vehicle to one or more systems of the vehicle, the computer-executable instructions comprising instructions for: detecting a condition that requires disengagement of the one or more high voltage contactors; disengaging the one or more high voltage contactors; transmitting, to a remotely located server, a user request to reengage the high voltage contactors from a user of the electric vehicle; initiating a safety check protocol to verify an absence of any condition that would warrant disengagement, wherein initiating the safety check protocol comprises remotely triggering the safety check protocol via a telematics unit within the vehicle; and reengaging the high voltage contactors if the safety check protocol verifies an absence of any condition that would warrant disengagement.

12. The non-transitory computer-readable medium according to claim 11, wherein detecting a condition that requires disengagement of the one or more high voltage contactors comprises detecting a condition that presents a risk to one of personnel safety and vehicle safety.

13. The non-transitory computer-readable medium according to claim 11, wherein disengaging the one or more high voltage contactors comprise electrically energizing or de-energizing the contactors to disengage them.

14. The non-transitory computer-readable medium according to claim 11, wherein reengaging the high voltage contactors if the safety check protocol is successfully completed comprises reengaging the high voltage contactors if no vehicle malfunctions are detected.

15. The non-transitory computer-readable medium according to claim 11, wherein reengaging the high voltage contactors if the safety check protocol is successfully completed comprises reengaging the high voltage contactors if no vehicle malfunctions relating to personnel safety are detected.

16. The non-transitory computer-readable medium according to claim 11, wherein the computer-executable instructions further comprising re-executing the safety check protocol one or more times if the safety checks protocol detects a condition that would warrant disengagement.

* * * * *